United States Patent
Chang et al.

(10) Patent No.: US 10,152,138 B2
(45) Date of Patent: Dec. 11, 2018

(54) INPUT SYSTEM, KEYBOARD DEVICE AND LOCKING METHOD

(71) Applicants: DEXIN ELECTRONIC LTD., Donggaun Guangdong (CN); DEXIN CORPORATION, New Taipei (TW)

(72) Inventors: Yuan-Jung Chang, New Taipei (TW); Cheng-Lun Chang, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 37 days.

(21) Appl. No.: 15/390,778

(22) Filed: Dec. 27, 2016

(65) Prior Publication Data

US 2018/0181211 A1    Jun. 28, 2018

(51) Int. Cl.
*G06F 3/02* (2006.01)

(52) U.S. Cl.
CPC .................................. *G06F 3/0227* (2013.01)

(58) Field of Classification Search
CPC ..................................................... G06F 3/0227
See application file for complete search history.

(56) References Cited

U.S. PATENT DOCUMENTS

| | | | | | |
|---|---|---|---|---|---|
| 5,613,135 | A | * | 3/1997 | Sakai | G06F 1/1616 710/62 |
| 5,754,798 | A | * | 5/1998 | Uehara | G06F 1/3203 710/104 |
| 6,742,027 | B1 | * | 5/2004 | Cromer | G06F 21/83 709/208 |
| 2003/0058215 | A1 | * | 3/2003 | Yamaji | G06F 3/0489 345/156 |
| 2003/0084169 | A1 | * | 5/2003 | Zhu | H04L 29/06 709/229 |
| 2005/0073501 | A1 | * | 4/2005 | Chen | G06F 3/03543 345/163 |
| 2006/0143465 | A1 | * | 6/2006 | Lai | G06F 21/34 713/182 |
| 2007/0200734 | A1 | * | 8/2007 | Lee | G06F 1/1626 341/22 |
| 2009/0140890 | A1 | * | 6/2009 | Bao | G06F 3/023 341/26 |

* cited by examiner

*Primary Examiner* — Ariel Balaoing
(74) *Attorney, Agent, or Firm* — Li & Cai Intellectual Property (USA) Office

(57) ABSTRACT

Provided herein are an input system, a keyboard device and a locking method. The keyboard device includes a key module, a transmission interface and a processing module. The key module includes a plurality of keys. The transmission interface is used for connecting a computer. The processing module is connected to the key module and the transmission interface. The processing module receives a locking signal from the transmission interface and locks at least one key of the key module according to the locking signal making the locked key stop outputting signal to the computer, wherein the locking signal is outputted from a peripheral device connected to the computer. Accordingly, the present invention can achieve the purpose of using a peripheral device to lock and unlock the specific key of the keyboard device.

19 Claims, 5 Drawing Sheets

| signal | Scroll Lock | Caps Lock | Num Lock | action |
|---|---|---|---|---|
| locking signal | OFF | ON | ON | Locking the Windows key |
| unlocking signal | ON | OFF | ON | Unlocking the Windows key |

FIG. 3A

| signal | Scroll Lock | Caps Lock | Num Lock | action |
|---|---|---|---|---|
| locking signal | OFF | on/off three times per second | OFF | Locking the Caps Lock key |
| unlocking signal | on/off three times per second | OFF | OFF | Unlocking the Caps Lock key |

FIG. 3B

INPUT SYSTEM, KEYBOARD DEVICE AND LOCKING METHOD

BACKGROUND OF THE INVENTION

1. Field of the Invention

The present invention relates to an input system, a keyboard device and a locking method; in particular, to an input system, a keyboard device and a locking method for locking and unlocking a specific key of the keyboard device.

2. Description of Related Art

The use of computers is indispensable to most people today, and the fast operation of computers has become more important with the development of various types of software applications such as computer games, social networking applications and the World Wide Web.

For example, it is often necessary to quickly enter instructions for computer game play today. However, there are often some specific keys of a keyboard device that are not required for a specific game, such as the control key (Ctrl), the Alt key, the Windows key, the shift key, or the Caps Lock key. If the user accidentally touches the keys not required in the game play, this may cause an error or the game to be interrupted.

In conventional technologies, manufacturers have developed the locking software which can be installed in the computer. The user can operate the locking software to shield or lock the specific keys not required of the keyboard device so that the functions corresponding to these keys are not executed when these keys are pressed.

In addition, there are manufacturers designing a specific keyboard device with a lock key in conventional technologies. The user may operate the lock key to lock the specific key of the keyboard device.

However, the user needs to install the locking software in a software locking way, which increases inconvenience of use. The locking software installed will also consume computer resources and may cause software conflicts.

When the user uses the keyboard device with the lock key, the user has to change hand position to operate the lock key of the keyboard device during the game play or the program operation, which may interrupt the game play or the program operation. For example, when a user uses the left hand to operate the keyboard device and uses the right hand to operate a mouse to play a stimulating computer game, if the user needs to lock a specific key of the keyboard device, the user should change the position of fingers to operate the lock key, which may cause mistakes or interruption of the game play.

Therefore, an input system, a keyboard device and a locking method for locking and unlocking the specific key of the keyboard device are desired.

SUMMARY OF THE INVENTION

The object of the present invention is to provide an input system, a keyboard device and a locking method for locking and unlocking a specific key of the keyboard device. The embodiments of the present invention achieve the purpose of using a peripheral device to lock or unlock a specific key of the keyboard device without installing a specific locking software on the computer.

In order to achieve the aforementioned objects, according to an embodiment of the present invention, a keyboard device is applied to a computer, comprising: a key module, comprising a plurality of keys; a transmission interface for connecting the computer; and a processing module coupled to the key module and the transmission interface; wherein the processing module receives a locking signal through the transmission interface and locks at least one of the keys according to the locking signal to make the locked key stop outputting signal to the computer; wherein the locking signal is outputted from a peripheral device connected to the computer.

In order to achieve the aforementioned objects, according to another embodiment of the present invention, an input system is applied to a computer, comprising: a peripheral device, connected to the computer for outputting a locking signal; and a keyboard device is connected to the computer, comprising: a key module, comprising a plurality of keys; a transmission interface for connecting the computer; and a processing module coupled to the key module and the transmission interface; wherein the processing module receives the locking signal through the transmission interface and locks at least one of the keys according to the locking signal to make the locked key stop outputting signal to the computer.

In order to achieve the aforementioned objects, according to still another embodiment of the present invention, a locking method for a keyboard device is applied to a computer, comprising: a peripheral device connected to the computer outputting a locking signal; the keyboard device receives the locking signal through the computer; and the keyboard device locks at least one of the keys according to the locking signal to make the locked key stop outputting signal to the computer.

In order to further the understanding regarding the present invention, the following embodiments are provided along with illustrations to facilitate the disclosure of the present invention.

BRIEF DESCRIPTION OF THE DRAWINGS

FIG. 3A shows a schematic diagram of the signal code according to one embodiment of the present invention;

FIG. 3B shows a schematic diagram of the signal code according to another embodiment of the present invention;

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
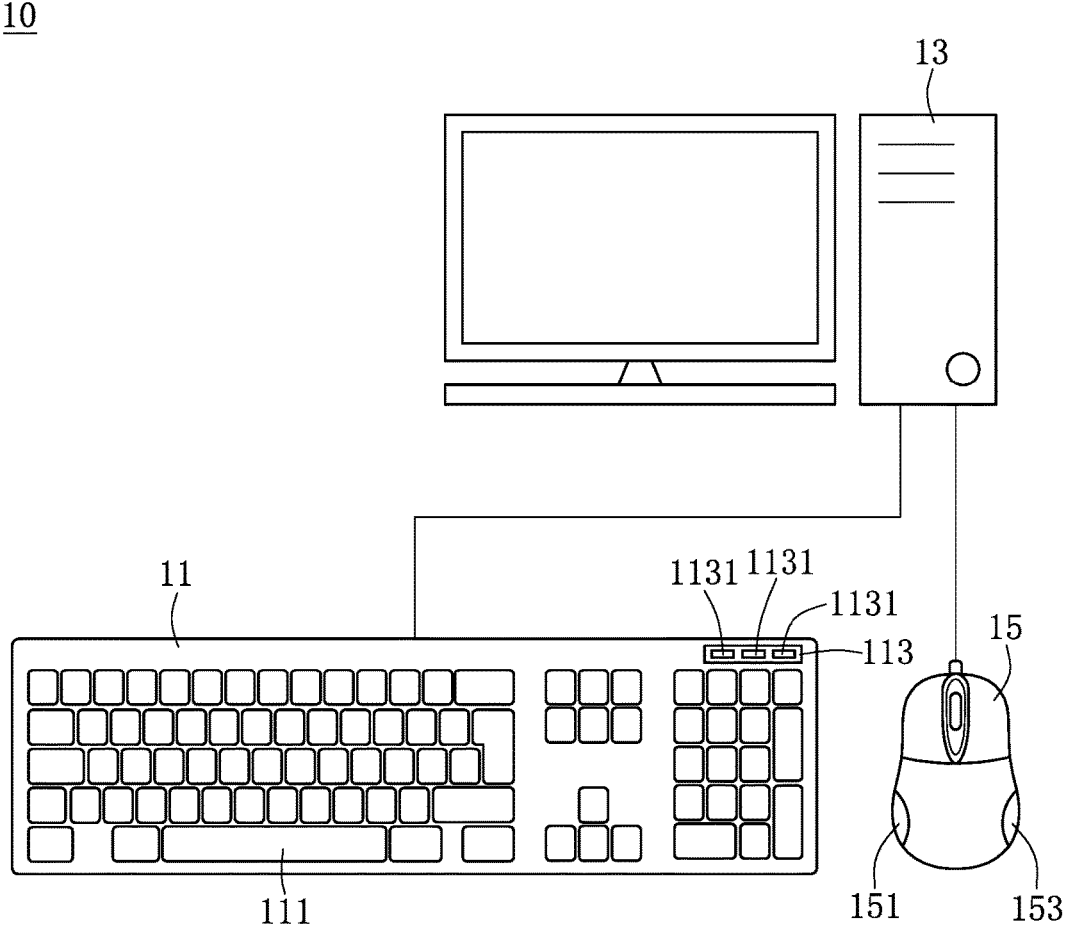
FIG. 1 shows a schematic diagram of an input system according to one embodiment of the present invention.

Referring to FIG. 1, FIG. 1 is a schematic diagram of an input system according to one embodiment of the present invention. In FIG. 1, the input system 10 includes a keyboard device 11, a computer 13 and a peripheral device 15. The keyboard device 11 includes a key module 111 and an information prompt module 113. The information prompt module 113 includes at least one light emitting element 1131. The peripheral device 15 includes a lock key 151 and an unlock key 153. The keyboard device 11 and the peripheral device 15 can be linked wiredly or wirelessly to the computer 13.

The key module 111 of the keyboard device 11, for example, could be a key circuit with a plurality of keys. The information prompt module 113, for example, could be an information prompt circuit with at least one light emitting element 1131. The light emitting element 1131, for example, could be the indicator lights of the Scroll Lock key, the Caps Lock key or the Num Lock key of the keyboard device 11. The light emitting element 1131, for example, could be a liquid crystal display element, a light-emitting diode element, an organic light-emitting diode element, or other display element capable of displaying characters or symbols, to which the present invention is not limited.

In the present embodiment, the peripheral device 15 is exemplified by a mouse. However, the peripheral device 15 also could be a keyboard or a game controller, to which the present invention is not limited. The user can press the keys of the key module 111 and/or use the mouse to operate the computer 13.

When the user wants to lock the specific key of the keyboard device 11 to avoid touching in game play or a software operation, the user can operate the lock key 151 of the peripheral device 15 to output a locking signal to the computer 13, and then the computer 13 can transmit the locking signal to the keyboard device 11. The keyboard device 11 locks the specific key of the key module 111 according to the locking signal received to make the locked key stop outputting signal to the computer 13.

The locked key, for example, could be the control key (Ctrl), the Alt key, the Windows key, the shift key, the Caps Lock key or any combination of one or more keys of the keyboard device 11, to which the present invention is not limited.

When the user wants to unlock the locked key of the keyboard device 11, the user can operate the unlock key 153 of the peripheral device 15 to output an unlocking signal to the computer 13. The computer 13 can transmit the unlocking signal to the keyboard device 11. The keyboard device 11 unlocks the locked key of the key module 111 according to the unlocking signal received to make the locked key resume outputting signal to the computer 13.

The locking signal and the unlocking signal are encoded by the keyboard indicator light control instruction outputted from the computer 13 to the keyboard device 11. The locking signal and the unlocking signal, for example, could be the combination of the keyboard indicator light control instructions, that is, a combined signal of the on/off of keyboard indicator lights. The locking signal and the unlocking signal also could be the frequency of on/off of the keyboard indicator lights, to which the present invention is not limited, so that the computer 13 can directly transmit the locking signal and the unlocking signal to the keyboard device 11 when receiving them from the peripheral device 15, thereby achieving the purpose of using a peripheral device 15 to lock or unlock the specific key of the keyboard device 11 without installing a specific locking software on the computer 13. The details are described in the following descriptions.

Figure 2:
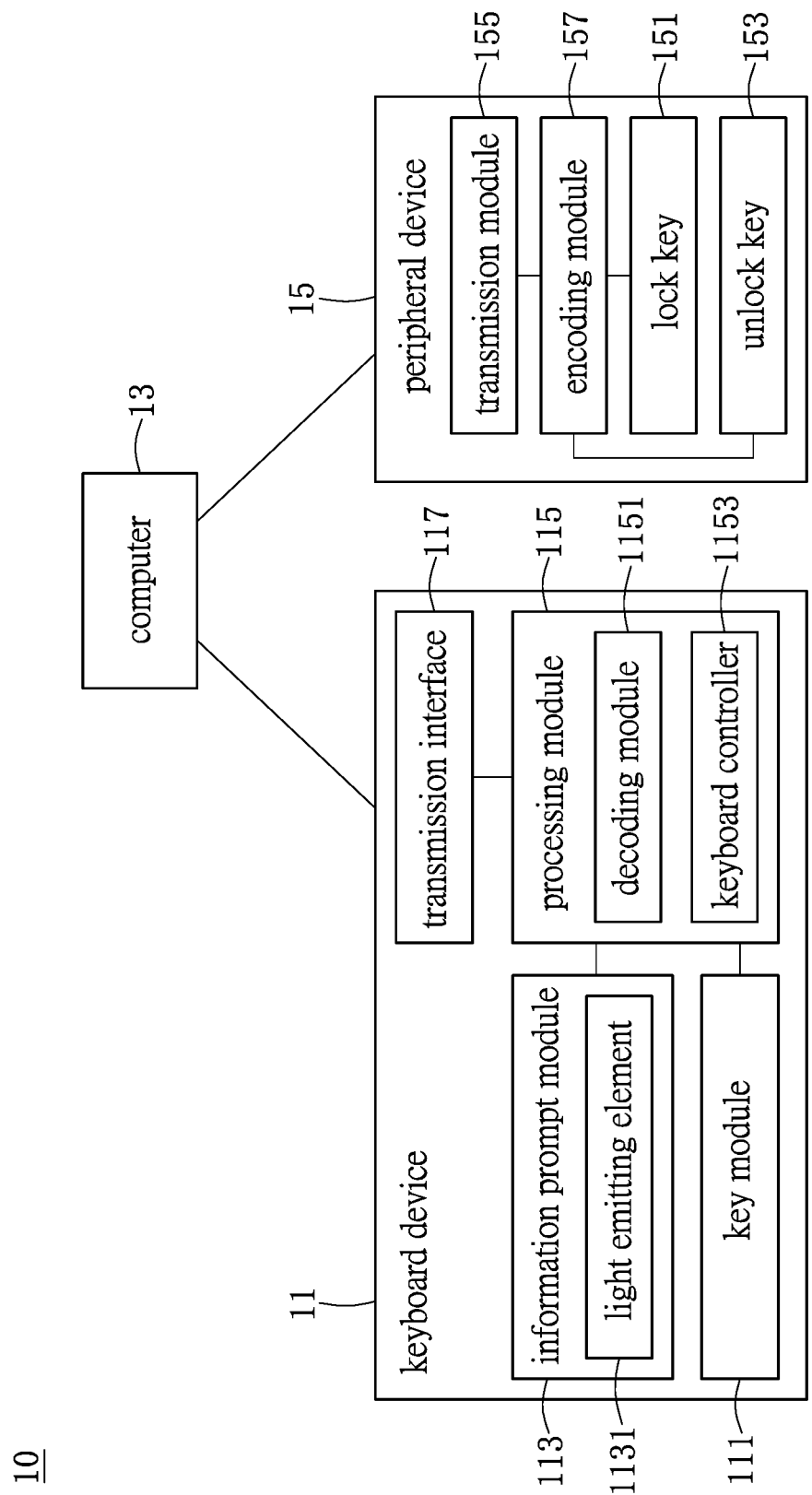
FIG. 2 shows a block diagram of an input system according to one embodiment of the present invention.

Referring to FIG. 2 and FIG. 1, FIG. 2 is a block diagram of an input system according to one embodiment of the present invention. In FIG. 2, the input system 10 includes a keyboard device 11, a computer 13 and a peripheral device 15. The keyboard device 11 includes a key module 111, an information prompt module 113, a processing module 115 and a transmission interface 117. The processing module 115 is coupled to the key module 111, the information prompt module 113 and the transmission interface 117 respectively. The processing module 115 includes a decoding module 1151 and a keyboard controller 1153. The information prompt module 113 includes at least one light emitting element 1131. The transmission interface 117 is coupled wiredly or wirelessly to the computer 13.

For convenience of explanation, the peripheral device 15 could include a lock key 151, an unlock key 153, a transmission module 155 and an encoding module 157, but the peripheral device 15 may also include other related circuitry. The lock key 151 and the unlock key 153 are coupled to the encoding module 157, and the encoding module 157 is coupled to the transmission module 155. The transmission module 155 is coupled wiredly or wirelessly to the computer 13.

The processing module 115 of the keyboard device 11, for example, could be a processing circuit with controllers and related circuits. In the present embodiment, the processing module 115 is exemplified by the keyboard controller 1153 and the decoding module 1151. The decoding module 1151, for example, could be a software or hardware decoder, and the encoding module 157, for example, also could be a software or hardware encoder, to which the present invention is not limited.

When the user wants to lock the specific key of the keyboard device 11 to avoid touching in game play or a software operation, the user can operate the lock key 151 of the peripheral device 15 to make the encoding module 157 generating a locking signal according to the keyboard indicator light control instruction outputted from the computer 13 to the keyboard device 11. The encoding module 157 wiredly or wirelessly transmits the locking signal to the computer 13 through the transmission module 155. Since the locking signal is encoded by the keyboard indicator light control instruction, the computer 13 can directly transmit the locking signal to the keyboard device 11 when receiving it from the peripheral device 15.

The processing module 115 of the keyboard device 11 wiredly or wirelessly receives the locking signal through the transmission interface 117, and then the decoding module 1151 decodes the locking signal. The keyboard controller 1153 locks the specific key of the key module 111 according to the decoded result of the decoding module 1151 to make the locked key stop outputting signal to the computer 13, thereby achieving the purpose of using a peripheral device 15 to lock a specific key of the keyboard device 11.

When the user wants to unlock the locked key of the keyboard device 11, the user can operate the unlock key 153 of the peripheral device 15 to make the encoding module 157 generate an unlocking signal according to the keyboard indicator light control instruction outputted from the computer 13 to the keyboard device 11. The encoding module 157 wiredly or wirelessly transmits the unlocking signal to the computer 13 through the transmission module 155. Since the unlocking signal is encoded by the keyboard indicator light control instruction, the computer 13 can directly transmit the unlocking signal to the keyboard device 11 when receiving it from the peripheral device 15.

The processing module 115 of the keyboard device 11 wiredly or wirelessly receives the unlocking signal through the transmission interface 117, and then the decoding module 1151 decodes the unlocking signal. The keyboard controller 1153 unlocks the locked key of the key module 111 according to the decoded result of the decoding module 1151 to make the locked key resume outputting signal to the computer 13, thereby achieving the purpose of using a peripheral device 15 to unlock the locked key of the keyboard device 11.

The locking signal and the unlocking signal is encoded by the keyboard indicator light control instruction outputted from the computer 13 to the keyboard device 11, so that the computer 13 can directly transmit the locking signal and the unlocking signal to the keyboard device 11 when receiving them from the peripheral device 15. The detailed coding will be described in the following description.

Referring to FIG. 3A, FIG. 3A is a schematic diagram of the signal code according to one embodiment of the present invention. In FIG. 3A, the locking signal in this embodiment is an encoding of "the indicator light of the Scroll Lock key is off, the indicator light of the Caps Lock key is on and the indicator light of the Num Lock key is on", and the default action of this coding is to lock the Windows key of the keyboard device 11. Therefore, when the processing module 115 of the keyboard device 11 receives a signal encoded with "the indicator light of the Scroll Lock key is off, the indicator light of the Caps Lock key is on and the indicator light of the Num Lock key is on", the decoding module 1151 decodes the signal received and obtains the action according to this signal to lock the Windows key of the keyboard device 11. Then, the keyboard controller 1153 locks the Windows key of the key module 111 according to the decoded result of the decoding module 1151 to make the Windows key not output signal to the computer 13 when being pressed.

In this embodiment, the unlocking signal is an encoding of "the indicator light of the Scroll Lock key is on, the indicator light of the Caps Lock key is off and the indicator light of the Num Lock key is on", and the default action of this encoding is to unlock the Windows key of the keyboard device 11. Therefore, when the processing module 115 of the keyboard device 11 receives a signal encoded with "the indicator light of the Scroll Lock key is on, the indicator light of the Caps Lock key is off and the indicator light of the Num Lock key is on", the decoding module 1151 decodes the signal received and obtains the action according to this signal to unlock the Windows key of the keyboard device 11. Then, the keyboard controller 1153 unlocks the Windows key of the key module 111 according to the decoded result of the decoding module 1151 to make the Windows key output signal to the computer 13 when pressed.

Referring to FIG. 3B, FIG. 3B is a schematic diagram of the signal code according to another embodiment of the present invention. The present embodiment is different from the embodiment in FIG. 3A in that the locking signal is an encoding of "the indicator light of the Scroll Lock key is off, the indicator light of the Caps Lock key is on/off three times per second and the indicator light of the Num Lock key is off", and the default action of this coding is to lock the Caps Lock key of the keyboard device 11. Also, the unlocking signal is an encoding of "the indicator light of the Scroll Lock key is on/off three times per second, the indicator light of the Caps Lock key is off and the indicator light of the Num Lock key is off", and the default action of this encoding is to unlock the Caps Lock key of the keyboard device 11.

The encodings of the locking signal and the unlocking signal shown in FIG. 3A and FIG. 3B are merely illustrative, to which the present invention is not limited. In practice, the locking signal and the unlocking signal could be encoded by any combination of the on/off of indicator lights of the Scroll Lock key, the Caps Lock key and the Num Lock key.

In one embodiment of the present invention, the peripheral device 15 is a mouse. The lock key 151 and the unlock key 153, for example, could be any possible combination of the left, right and/or scroll keys of a peripheral device 15. For example, pressing the left key and scrolling the scroll key up at the same time will output the locking signal, and pressing the left key and scrolling the scroll key down at the same time will output the unlocking signal, to which the present invention is not limited. The lock key 151 and the unlock key 153 also could be a specific key of the peripheral device 15, such as a separate key other than the left, right and scroll keys of mouse, to which the present invention is not limited.

In one embodiment of the present invention, the peripheral device 15 is a keyboard. The lock key 151 and the unlock key 153, for example, could be any possible combination of the keys of the keyboard, to which the present invention is not limited.

In one embodiment of the present invention, the peripheral device 15 comprises a control key (not shown in the Figures). The user can operate the control key to alternately output the locking signal and the unlocking signal. For example, the user presses the control key once to output the locking signal and presses the control key once again to output the unlocking signal, so that the functions of the lock key 151 and the unlock key 153 are realized by a single control key.

In one embodiment of the present invention, the transmission interface 117 and the transmission module 155, for example, could be the wireless transmission circuit of Bluetooth, WIFI, NFC, or ZigBee, and also could be the wired transmission circuit of USB or PS/2, to which the present invention is not limited.

In one embodiment of the present invention, the encoding module 157 includes an encoding table (not shown in the Figures). The encoding table could be implemented as a memory, a storage device or firmware, to which the present invention is not limited. The encoding table could store the coding information of the locking signal and the unlocking signal. The encoding module 157 generates the locking signal and the unlocking signal according to the encoding table.

In one embodiment of the present invention, the decoding module 1151 includes a decoding table (not shown in the Figures). The decoding table could be implemented as a memory, a storage device or firmware, to which the present invention is not limited. The decoding table could store the coding information of the locking signal and the unlocking signal. The decoding module 1151 decodes the locking signal and the unlocking signal according to the decoding table.

Figure 4:
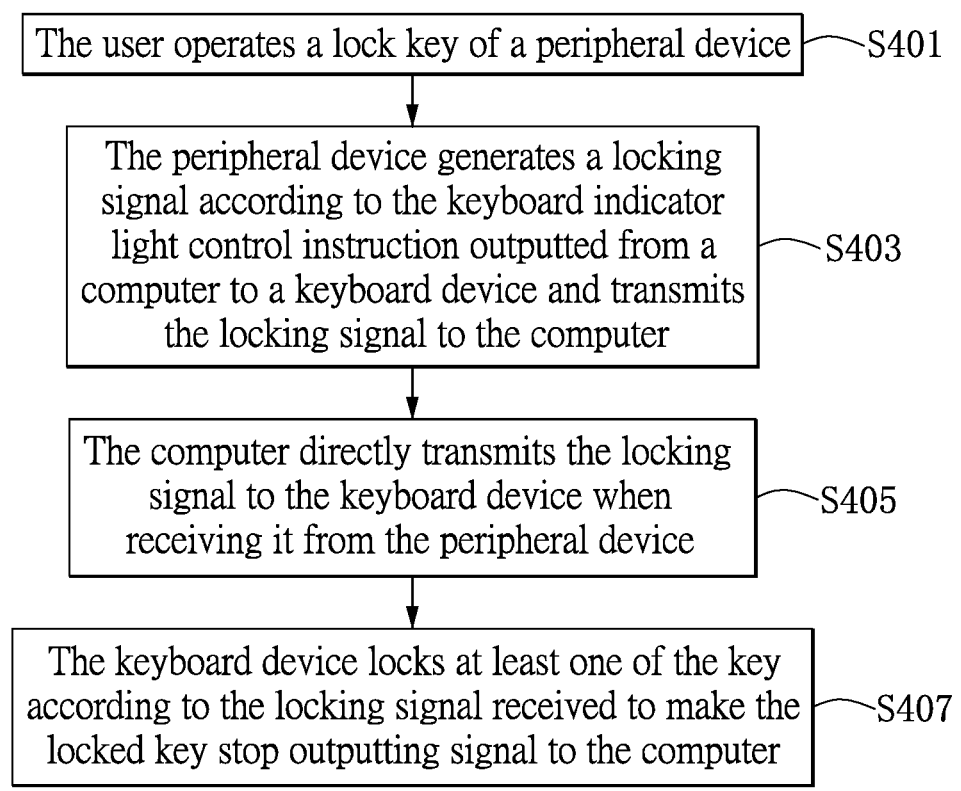
FIG. 4 shows a flowchart of a locking method for locking according to one embodiment of the present invention.

Referring to FIG. 4 and FIG. 2, FIG. 4 is a flowchart of a locking method for locking according to one embodiment of the present invention. In step S401, when the user wants to lock the specific key of the keyboard device 11 to avoid touching in the game play or software operation, the user can operate the lock key 151 of the peripheral device 15 to execute the action of locking. In step S403, the encoding module 157 of the peripheral device 15 generates a locking signal according to the keyboard indicator light control instruction outputted from the computer 13 to the keyboard device 11. The encoding module 157 wiredly or wirelessly transmits the locking signal to the computer 13 through the transmission module 155. The locking signal, for example, could be any combination of the on/off of indicator lights of the Scroll Lock key, the Caps Lock key and the Num Lock key.

In step S405, since the locking signal is encoded by the keyboard indicator light control instruction, the computer 13 can directly transmit the locking signal to the keyboard device 11 when receiving it from the peripheral device 15. In step S407, the processing module 115 of the keyboard device 11 wiredly or wirelessly receives the locking signal through the transmission interface 117, and then the decoding module 1151 decodes the locking signal. The keyboard controller 1153 locks the specific key of the key module 111 according to the decoded result of the decoding module 1151 to make the locked key stop outputting signal to the computer 13, thereby achieving the purpose of using a peripheral device 15 to lock the specific key of the keyboard device 11.

Figure 5:
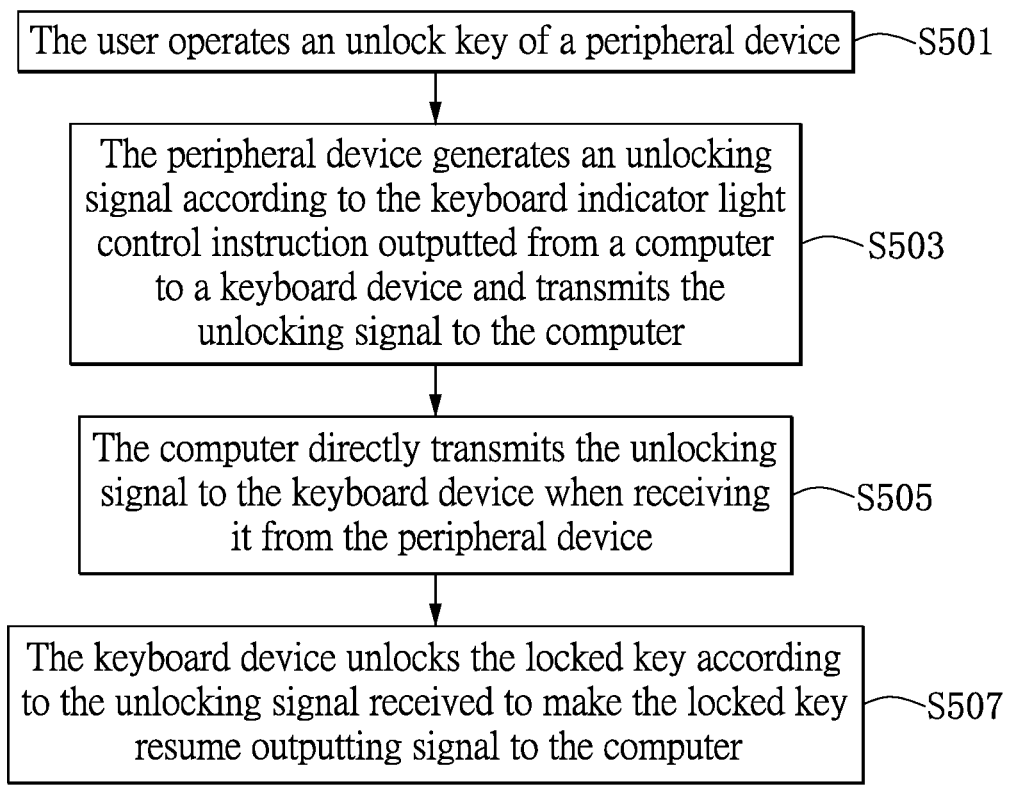
FIG. 5 shows a flowchart of a method for unlocking according to one embodiment of the present invention.

Referring to FIG. 5 and FIG. 2, FIG. 5 is a flowchart of a method for unlocking according to one embodiment of the present invention. In step S501, when the user wants to unlock the locked key of the keyboard device 11, the user can operate the unlock key 153 of the peripheral device 15 to execute the action of unlocking. In step S503, the encoding module 157 of the peripheral device 15 generates an unlocking signal according to the keyboard indicator light control instruction outputted from the computer 13 to the keyboard device 11. The encoding module 157 wiredly or wirelessly transmits the unlocking signal to the computer 13 through the transmission module 155. The unlocking signal, for example, could be any combination of the on/off of indicator lights of the Scroll Lock key, the Caps Lock key and the Num Lock key.

In step S505, since the unlocking signal is encoded by the keyboard indicator light control instruction, the computer 13 can directly transmit the unlocking signal to the keyboard device 11 when receiving it from the peripheral device 15. In step S507, the processing module 115 of the keyboard device 11 wiredly or wirelessly receives the unlocking signal through the transmission interface 117, and then the decoding module 1151 decodes the unlocking signal. The keyboard controller 1153 unlocks the locked key of the key module 111 according to the decoded result of the decoding module 1151 to make the locked key resume outputting signal to the computer 13, thereby achieving the purpose of using a peripheral device 15 to unlock the locked key of the keyboard device 11.

In summary, in view of the above teachings, an input system, a keyboard device and a locking method according to the present invention generate the locking signal and the unlocking signal according to the keyboard indicator light control instruction outputted from the computer to the keyboard device, to achieve the purpose of using a peripheral device to lock and unlock the specific key of the keyboard device.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A keyboard device applied to a computer, comprising:
a key module, comprising a plurality of keys;
a transmission interface for connecting the computer; and
a processing module coupled to the key module and the transmission interface;
wherein the processing module receives a locking signal through the transmission interface and locks at least one of the keys according to the locking signal to make the locked key stop outputting signal to the computer;
wherein the locking signal is outputted from a peripheral device connected to the computer; and
wherein the locking signal is encoded by a keyboard indicator light control instruction.

2. The keyboard device according to claim 1, wherein the processing module receives an unlocking signal through the transmission interface and unlocks the locked key according to the unlocking signal to make the locked key resume outputting signal to the computer, wherein the unlocking signal is outputted from the peripheral device connected to the computer.

3. The keyboard device according to claim 2, wherein the locking signal and the unlocking signal are encoded by the keyboard indicator light control instruction outputted from the computer to the keyboard device, so that the computer can directly transmit the locking signal and the unlocking signal to the keyboard device when receiving them from the peripheral device.

4. The keyboard device according to claim 3, wherein the keyboard indicator light control instruction is the indicator light control instruction of the Scroll Lock key, the Caps Lock key or the Num Lock key.

5. The keyboard device according to claim 3, wherein the processing module comprises a decoding module, the decoding module decodes the locking signal and the unlocking signal; and a keyboard controller coupled to the decoding module, the keyboard controller locking or unlocking at least one of the keys according to the decoded result of the decoding module.

6. The keyboard device according to claim 1, wherein the locked key is the control key (Ctrl), the Alt key, the Windows key, the shift key, or the Caps Lock key.

7. An input system applied to a computer, comprising:
a peripheral device, connected to the computer for outputting a locking signal; and
a keyboard device connected to the computer, comprising:
a key module, comprising a plurality of keys;
a transmission interface for connecting the computer; and
a processing module coupled to the key module and the transmission interface;
wherein the processing module receives the locking signal through the transmission interface and locks at least one of the keys according to the locking signal to make the locked key stop outputting signal to the computer; and
wherein the locking signal is encoded by a keyboard indicator light control instruction.

8. The input system according to claim 7, wherein the processing module receives an unlocking signal through the transmission interface and unlocks the locked key according to the unlocking signal to make the locked key resume outputting signal to the computer, wherein the unlocking signal is outputted from the peripheral device connected to the computer.

9. The input system according to claim 8, wherein the locking signal and the unlocking signal are encoded by the keyboard indicator light control instruction outputted from the computer to the keyboard device, so that the computer can directly transmit the locking signal and the unlocking signal to the keyboard device when receiving them from the peripheral device.

10. The input system according to claim 9, wherein the keyboard indicator light control instruction is the indicator light control instruction of the Scroll Lock key, the Caps Lock key or the Num Lock key.

11. The input system according to claim 9, wherein the processing module comprises a decoding module, the decoding module decodes the locking signal and the unlocking signal; and a keyboard controller coupled to the decoding module, the keyboard controller locking or unlocking at least one of the keys according to the decoded result of the decoding module.

12. The input system according to claim 9, wherein the peripheral device comprises a lock key and an unlock key, the lock key is for outputting the locking signal and the unlock key is for outputting the unlocking signal.

13. The input system according to claim 9, wherein the peripheral device comprises a control key, the control key is for alternately outputting the locking signal and the unlocking signal.

14. The input system according to claim 9, wherein the peripheral device comprises an encoding module, the encoding module encodes the locking signal and the unlocking signal by a keyboard indicator light control instruction outputted from the computer to the keyboard device.

15. The input system according to claim 7, wherein the peripheral device is a mouse, a keyboard or a game controller.

16. A locking method for a keyboard device applied to a computer, comprising:
    a peripheral device connected to the computer outputs a locking signal;
    the keyboard device receives the locking signal through the computer; and
    the keyboard device locks at least one of the keys according to the locking signal to make the locked key stop outputting signal to the computer,
    wherein the locking signal is encoded by a keyboard indicator light control instruction.

17. The locking method for a keyboard device according to claim 16, further comprising:
    the peripheral device connected to the computer outputs an unlocking signal;
    the keyboard device receives the unlocking signal through the computer; and
    the keyboard device unlocks the locked key according to the unlocking signal to make the locked key resume outputting signal to the computer.

18. The locking method for a keyboard device according to claim 17, wherein the locking signal and the unlocking signal are encoded by the keyboard indicator light control instruction outputted from the computer to the keyboard device, so that the computer can directly transmit the locking signal and the unlocking signal to the keyboard device when receiving them from the peripheral device.

19. The locking method for a keyboard device according to claim 18, wherein the keyboard indicator light control instruction is the indicator light control instruction of the Scroll Lock key, the Caps Lock key or the Num Lock key.

* * * * *